United States Patent [19]

Barrington et al.

[11] 3,980,488

[45] Sept. 14, 1976

[54] PIGMENT CONDITIONING AND VEHICLE FLUSHING PROCESS

[75] Inventors: David W. Barrington, Chicago; Irwin B. Bernstein, Homewood; Thomas C. Rees, Park Forest South; Anthony P. Wagener, Jr., Park Forest, all of Ill.

[73] Assignee: The Sherwin-Williams Company, Cleveland, Ohio

[22] Filed: Mar. 7, 1972

[21] Appl. No.: 232,319

[52] U.S. Cl. .................... 106/262; 106/308 Q; 106/309; 260/22 R; 260/24; 260/34.2; 260/37 R; 260/40 R; 260/42.14; 260/42; 260/44; 260/314.5
[51] Int. Cl.² .................... C08J 3/20; C08L 91/00; C08L 93/00
[58] Field of Search ............... 106/262, 309, 308 Q, 106/228; 260/314.5, 22 R, 24, 37 R, 40 R, 34.2, 42.14, 42.44

[56] References Cited
UNITED STATES PATENTS

| | | | |
|---|---|---|---|
| 2,379,678 | 7/1945 | Brown et al. | 106/262 |
| 2,857,400 | 10/1958 | Cooper | 260/314.5 |
| 3,017,414 | 1/1962 | Minnich et al. | 260/314.5 |
| 3,370,065 | 2/1968 | Nold et al. | 260/314.5 |
| 3,615,800 | 10/1971 | Spietschka et al. | 106/309 |

FOREIGN PATENTS OR APPLICATIONS

| | | | |
|---|---|---|---|
| 1,087,004 | 10/1967 | United Kingdom | 260/314.5 |

OTHER PUBLICATIONS

McCormack, "Flushed Colors and Printing Inks," American Ink Maker, May, 1961, pp. 79, 80 and 118.

Primary Examiner—Allan Lieberman
Attorney, Agent, or Firm—Lowell G. Wise; Richard G. Smith; James V. Tura

[57] ABSTRACT

Colored organic solid particles of potential value as pigments are partially milled to an extent less than that required to develop full pigmentary strength by size reduction and further conditioned concurrently with a flushing step. The organic pigment particles are transferred from an aqueous dispersion to an organic hydrophobic vehicle in the presence of an organic breaching agent. The resulting flushed pigmented vehicle has pigmentary strength at least equal to that obtained by fully conditioning the crude particles without the breaching treatment. The conditioned pigments need not be recovered as a dry powdered product. The process is valuable in the manufacture of flushed phthalocyanines, quinacridones, etc., with substantial improvement in equipment utilization in milling. The flushed pigmented vehicles are useful in manufacture of paints, varnishes, lacquers, inks, color concentrates, and formulations for mass coloration of plastics.

17 Claims, No Drawings

PIGMENT CONDITIONING AND VEHICLE FLUSHING PROCESS

BACKGROUND OF THE INVENTION

This invention relates to the manufacture of pigmented organic vehicles. In particular, it relates to an improved process for conditioning colored organic pigment by partial comminution of the crude pigment in an attrition, shear or impact type mill followed by a further conditioning of the pigment by treating the partially milled pigment with a breaching agent during a flushing operation to produce a pigmented organic vehicle having a pigment of enhanced pigmentary quality.

Many of thee colored pigments in commercial use at the present time are crystalline organic compounds which have been synthesized by chemical reaction. These compounds in their crude state are often relatively large as pigment particles, and satisfactory pigmentary properties are obtained only after the crude pigments have been subjected to particle size reduction and/or phase changes in the crystalline structure. For most pigments a particle size range of about 0.05 to 0.1 micron is desirable. Most commercial pigments have a particle size well below 0.2 microns, and the crude pigments, as prepared by most synthetic organic processes, have an average particle size of at least 5 to 20 microns. The desired reduction in particle size can often be achieved by prior art grinding processes alone; however, the amount of energy required and low production due to long grinding time has led workers in this art to seek shorter manufacturing methods for high quality pigments.

Numerous attempts have been made to grind pigments in the dry form without the addition of grinding aids; however, it has been found very difficult to produce satisfactory pigmentary particles. Common practice in industrial manufacture of organic pigments such as phthalocyanines is to charge an attrition-type mill with a large amount of inorganic salt in addition to the grinding elements. Typically, the prior art processes employed about 9 parts sodium chloride or borax per part of pigment when grinding in the dry state. With the total volume of grinding elements and salt being so large, only a relatively small amount of pigment could be milled for each batch.

It has been found that a subsequent treatment of dry milled pigment by agitation with a suitable organic liquid can improve the pigmentary properties. In U.S. Pat. Nos. 2,857,400 and 3,017,414 it has been demonstrated that partial milling of a crude pigment in the dry state, as by ball milling in the absence of any grinding aid, when treated with an organic liquid or aqueous emulsion of certain organic liquids can produce a satisfactory pigment. Typical organic liquids suitable for this treatment include dimethyl formamide, tetrachloroethylene, carbon tetrachloride,, o-dichlorobenzene, chlorobenzene, benzene, xylene, nitrobenzene, and benzonitrile. In British Pat. No. 1,087,004, the organic breaching liquids used for treating partially milled organic pigments included chloroform and 1,2-dibromo-1,1,2,2-tetrafluoroethane among the halogenated hydrocarbons suitable. Hexane and cyclohexane were found to be suitable parafinic and cycloaliphatic hydrocarbons. It was established that about 0.1 to 3 parts organic breaching liquid per part pigment was satisfactory to provide the essential characteristic of the breaching liquid in its apparent ability to wet the pigment surface and to diffuse along grain boundaries and into interstitial areas of pigment aggregates.

In the manufacture of most organic pigments, it is usually necessary to finish the pigment in several physical forms. In some cases the pigment is ground into the vehicle with which it is to be used. In other cases the use of toners, or dry undiluted power, is desirable. Diluted dry powders, or "lakes", undispersed presscakes, dispersed pastes and water-dispersible powders are other common forms of organic pigments offered commercially. In the prior art partial milling and breaching processes, it has been found necessary to recover the pigment from the breaching mixture, usually by distillation or other evaporation step, followed by some other finishing step to render the pigment commercially acceptable. Where the pigments are made in the form of toners or undiluted powders, the conversion of a wet pigment into dry powder form is not a straightforward matter. Most wet organic pigments tend to agglomerate irreversibly on drying, yielding hard, gritty powders of low tinctorial strength. In some manufacturing processes the addition of small amounts of fatty acids or wetting agents prior to drying can help solve this agglomeration problem. In the salt-milled pigments, which produce wet presscakes which may be dried directly to powder form, various finishing steps may be required to produce a satisfactory product. After the pigment powder has been dried, tinctorial strength may be lost during final pulverization or any amount of overgrinding may prove detrimental.

One procedure for utilizing wet or dispersed presscakes of conditioned organic pigments is the flushing process. This method makes possible the transfer of hydrophobic organic particles from an aqueous phase into an organic vehicle. This method has been used commercially to by-pass recovery of the fully conditioned pigment, thereby preventing possible loss of tinctorial strength due to drying or pulverization. The flushing process itself disperses the pigment thoroughly in the organic vehicle without further grinding or milling of the pigmented organic phase. The typical organic pigments which are conditioned by attrition milling and/or breaching are usually more readily wetted by an organic liquid phase or soft oleoresinous vehicle than by water; therefore, an aqueous slurry of such pigment is mixed with the organic vehicle and is transferred to the vehicle during the flushing process. The major amount of water is removed by conventional mechanical separation procedures.

SUMMARY OF THE INVENTION

It has been found that partially milled organic pigments can be flushed into an organic vehicle in the presence of a breaching agent to produce a pigmented vehicle which is substantially equal in tinctorial strength and other pigmentary properties to that which would be produced by incorporating a fully conditioned pigment into the vehicle.

This new process for manufacturing pigmented organic vehicles includes the steps of: (1) partially milling a crude organic pigment to an extent substantially less than that amount required to develop full pigmentary properties, usually less than half the time required for milling under essentially dry conditions; (2) flushing the partially milled organic pigment from an aqueous slurry or presscake into a hydrophobic organic vehicle by mixing the aqueous pigment with the vehicle and sufficient volatile organic liquid breaching agent to complete conditioning of the pigment, the breaching agent being essentially immiscible with water under the flushing conditions and being active to develop pigmentary qualities by contacting the pigment during flushing; (3) separating the water from the flushed mass mixture of pigment, vehicle and breaching agent; and (4) separating the volatile organic breaching agent from the pigmented mass by evaporation. By this process is produced a pigmented organic vehicle having pigmentary strength at least equal to that produced by incorporating a conditioned pigment of full strength directly into the whole.

It is preferred that the breaching agents be selected from liquid paraffins, cycloaliphatic and aromatic hydrocarbons, halogenated aliphatic hydrocarbons, alkyl esters of alkanoic acids, and alkyl ethers having a boiling point less than 200° C and a solubility in water not greater than about 5% by weight. Usually the breaching agent is used in an amount equal to about 10 to 300 parts per 100 parts of dry pigment.

This process is applicable to conditioning phthalocyanines, quinacridones, dioxazines, perylenes, indanthrones, and vat pigments by partially milling the pigments in an attrition or shear type mill with or without grinding aid and/or phase-directing materials. The combined breaching and flushing steps can utilize a wide variety of breaching agents and vehicles.

In the typical process, as for manufacturing flushed phthalocyanines, the milling operation is followed by treatment with a dilute aqueous mineral acid solution to extract impurities and grinding aids. The extracted pigment in a wet state does not require drying and can be transferred directly from aqueous slurry to the organic vehicle by flushing to produce pigmented vehicles useful for paints, inks, color concentrates, and mass coloration formulations.

DESCRIPTION

The present process is an improvement of the known process wherein a crude organic pigment is conditioned to essentially full pigmentary strength by two steps, including (1) partial milling of the crude pigment in an attrition mill and (2) treatment of the partially milled pigment with a breaching liquid to promote further conditioning beyond that obtained by milling alone. The breaching step is combined with an otherwise conventional flushing operation. In describing the new process, all units are given in parts by weight unless otherwise indicated.

The finishing of undispersed organic pigment presscakes by flushing procedures is increasingly important as an industrial operation. It makes possible the pigmentation of various non-aqueous vehicles with conditioned organic pigments. Flushing is one of the finishing steps commonly used for phthalocyanines, quinacridones, alkali blue, and numerous other organic colors used for making printing inks, coatings for protective and decorative use, and color dispersions or concentrates. Most organic pigments discussed herein are strongly hydrophobic, and are more easily dispersed in organic vehicles than in water. When an aqueous presscake or slurry of the organic pigment is mixed with an organic liquid or soft oleoresinous vehicle, such as bodied triglyceride oils, synthetic resins, organic plasticizers, etc., the pigment particles are transferred from the aqueous phase to the organic phase spontaneously by nature of their physical and chemical properties.

The aqueous phase is separated from the pigmented vehicle, as by decanting, centrifuging or other mechanical separation steps, thus leaving the aqueous phase free of pigment. Most of the aqueous phase can be removed by mechanical means; however, many end use requirements for flushed pigments demand further removal of water, which frequently becomes emulsified in the organic phase during the flushing or pulping steps. This remaining water can often be removed by evaporation, either by vacuum treatment or by heating. The flushing process avoids the agglomeration of pigment which ofen accompanies drying processes to obtain powdered pigment product.

In the typical flushing operation, sufficient organic vehicle is emulsified with the pigment in water slurry to provide a continuous coating of the pigment with the vehicle. The flushing operation is conventional in every aspect except the presence of an organic breaching agent. It is customary to add about 100 to 900 parts of organic vehicle per 100 parts of pigment on the dry basis, preferably about 120 to 800 parts vehicle. The organic phase may be added directly to an aqueous slurry of the pigment and breaching agent in one step with a simple phase separation or "break". This type of flushing procedure usually takes from ½ to 2 hours. As an alternative, the vehicle and aqueous pigment may be added to the flusher incrementally, with several phase separations. Where incremental addition of vehicle and presscake is used, the entire breaching agent may be added before the last phase separation or "break".

The combined breaching and flushing operation may be carried out in conventional equipment, such as high shear homogenizers, Kady mill, sigmablade mixers, etc. After separation of the water from the flushed pigmented vehicle the breaching agent may be removed by evaporation under vacuum or mill dried.

The breaching agent consists essentially of one or more volatile organic liquids which are essentially immiscible with water under the conditions of the flushing operation, which is usually carried out at a temperature ranging from ambient to the boiling range of the flushing mixture--i.e., about 20° to 100° C, preferably about 30°–50° C. It is preferred that these compounds or mixtures have a melting point below ambient temperature. These breaching agents are used in varying amounts depending upon the breaching action of the individual compounds or mixtures. Typically, at least about 1 part breaching agent per 100 parts dry pigment is required to effect the desired degree of conditioning within a reasonable time period. There appears to be no theoretical upper limit on the amount of breaching agent which may be used; however, nothing is known to be gained in using a large excess. It is preferred to use about 10-20 parts breaching agent; but, a ratio of 10 to 300 parts breaching agent per 100 parts pigment appears to be practical.

Preferred breaching agents include aromatic hydrocarbons having 6 to 10 carbon atoms, aliphatic and cycloaliphatic hydrocarbons having at least 5 carbon atoms, halogenated hydrocarbons having 1 to 10 carbon atoms, alkyl esters of alkanoic acids having a total of 4 to 12 carbon atoms, and alkyl ethers having 4 to 12 carbon atoms. Suitable hydrocarbons include aromatic, paraffinic, and cycloaliphatic liquid compounds boiling at about 20° to 200° C at ambient pressure. These include toluene, xylenes, ethyl benzene, n-hexane, cyclohexane and mixtures of these.

Halogenated hydrocarbons include those compounds having 1 to 6 carbon atoms, such as carbon tetrachloride, methylene chloride, chloroform, tetrachloroethylene, monochlorobenzene, o-dichlorobenzene, 1,2-dibromo-1,1,2,2-tetrafluoroethane.

Oxygenated compounds which function as breaching agents and have a high solubility in water give poor flushing performance; however, some oxygenated solvents have relatively low water solubility and can be used in the present process. Alkyl esters of alkanoic acids, such as ethyl acetate, are useful in the simultaneous breaching and flushing operations. Alkyl ethers, such as dibutyl ether, may be used also.

In order to promote fast diffusion of the breaching agent into the interstices of the pigment particles and along grain boundaries, it is preferred that the organic liquids have a relatively low viscosity in the temperature range of the flushing operation. Those pure liquids and mixtures of organic compounds having a visocity of about 0.2 to 3 centipoises in the range of 100° to 20° C are preferred for use as breaching agents.

The milling step used in the present process can be varied widely to accomodate the different types of crude organic pigments to be conditioned. In general, the milling apparatus may be of the attrition, shear or impact types. The grinding methods are essentially dry, as opposed to wet slurries of the pigment in large amounts of phase-directing organic compounds, such as tetrachloroethylene, with the crude pigment during certain conditioning steps; however, most workers in this field consider this to be essentially dry grinding. The attrition and shearing action desired for milling crude organic pigments to develop pigmentary properties may be accomplished in ball mills or rod mills of the rotary drum type, stirred or vibratory types.

The grinding media used in ball or rod mills are preferably hard metal or ceramic grinding elements of about 0.25 to 2 cm. diameter. The mill loading is largely conventional for ball milling operations, and the charge of grinding media usually occupies about half the volume of the mill. The total charge of the ball mill is usually maintained in the range of 60–75% of the mill volume. The use of grinding aids such as coarse inorganic salt (e.g.-- sodium chloride) is conventional, with the amount of salt used varying from about 1.5 to 9 parts by weight of salt per part dry pigment solids. For purposes of this invention, the use of phase-directing materials or high temperature milling to obtain a stable crystalline phase is conventional. The dry milling operation may be carried out in the presence of grinding media alone, or grinding media plus salt grinding aid, or grinding media plus phase-directing materials, or grinding media plus salt plus phase-directing materials.

The typical production-size ball mills require about 8 hours minimum milling time to achieve the degree of partial grinding required for developing fully pigmentary properties in combination with the breaching and flushing operations; whereas, equivalent milling time without breaching requires more than 24 hours, usually 30–50 hours. Also, in the typical prior art dry milling process, a rather large amount of salt grinding aid was necessary, typically about 9 parts coarse inorganic salt per part of phthalocyanine crude pigment. In the present process, not only is the throughput of the ball milling equipmment increased by shorter milling time, but also the ratio of salt grinding aid to pigment can be substantially reduced, this permitting a greater amount of pigment to be milled per mill charge. It has been found that a salt grinding aid to pigment ratio of about 1.5 to 4.0 parts salt per part pigment can produce full strength pigment with 4–16 hours milling time in a large plant-scale ball mill when a breaching agent is incorporated with the flushing vehicle.

It is not practical to delineate with accuracy the exact milling time. The type of pigment being treated, the mill loading, type of mill, speed of operation, size and shape of grinding elements, type and amount of salt grinding aid and desired crystalline phase all contribute to establishing the requirements of milling time.

Organic pigments which can be conditioned by the present process include several classes of commercially available materials. In the phthalocyanine class metal-free phthalocyanine in the alpha or beta forms; copper, nickel, zinc, cobalt, aluminum, iron, vanadium, beryllium, lead, manganese, tin and magnesium colvalent phthalocyanine complexes; halogenated and sulphonated phthalocyanines may be used. Where the chlorinated compound is conditioned, it is preferred to employ the semichloro- or monochloro-phthalocyanines. In general those phthalocyanine pigments containing statistically less than one substitutent per molecule are suitable. Dioxazine violet (2,9-diphenyl-6,13-dichloro-triphendioxazine) pigment may be treated in a manner similar to the phthalocyanines. Vat pigment such as the oxadiazoles may also be used. A fast red vat dye, 2,5-bis(1-amino-2-anthraquinonyl)-1,3,4-oxadiazole, can be conditioned by partial milling and flushing in the presence of a breaching agent. Another class of valuable organic pigments includes the quinacridones, having the parent structure guin(2,3b)-acridine-7,14(5,12)dione. These compounds include linear quinacridone, and substituted quinacridones such as monochloro-quinacridones, or 2,9-, 3,10-, or 4,11-dichloroquinacridone, 4,11-difluoroquinacridone, lowr alkyl and alkoxy derivatives of quinacridone, quinacridonequinones and mixtures of these with one another and with other compatible organic pigment particles. The quinacridones are known to form solid solutions with one another with are advantageously conditioned by milling and breaching in accordance with the teachings of this invention. Perylene reds and indanthrones may also be used as starting materials for the present process. Most of the above organic materials exist in two or more crystalline modifications, which differ from each other in solubility, shade and stability. It is common to call the meta-stable form the alpha form and other, more stable, crystalline forms, beta, gamma, etc. The various forms are readily identified from X-ray diffraction patterns and/or infrared spectra. Alteration of crystal structure can take place when certain forms of the organic pigments are stored in an organic vehicle containing deleterious solvents, particularly in certain paint or lacquer vehicles containing powerful aromatic solvents. Care should be taken in the selection of vehicles to remove such deleterious solvents before or after flushing.

EXAMPLE 1

Crude copper phthalocyanine pigment is conditioned by ball milling in the presence of coarse sodium chloride grinding aid in a rotary ball mill containing hardened steel ball grinding elements. In the partial milling step, the salt is added in an amount equal to 3.75 parts salt per part pigment. The crude copper phthalocyanine blue pigment is milled in a production size (2000 gallon) ball mill to make a green shade phthalocyanine blue pigment (beta form). The ball mill is charged with 32,000 lbs. of 5/8 inch hardened steel ball grinding elements and preheated to 120° C with a heat exchange jacket. To the heated mill is charged 800 lbs. of crude pigment and 3000 lbs. of dried coarse sodium chloride salt grinding aid. The grinding is continued at 15 r.p.m. for about 16 hours at a temperature of about 150°–155° C. The contents remain free flowing during the milling cycle. The partially milled pigment and grinding aid are separated from the steel balls and the mill is discharged by a conventional pneumatic conveying system.

The dry milled product is slurried in water using a mechanical disperser and the aqueous slurry is charged to an extraction tank along with about 34 parts of 98% sulfuric acid and sufficient water to make up a 2% acid solution together with the water used in making up the slurry. This mixture is heated at 95°-100° C and agitated for about 30 minutes, after which it is flooded with sufficient cold water to reduce the temperature to 60° C. The pigment solids are separated from the aqueous phase by filtration, washed for 4 hours with hot water and 1 hour with cold water. The resulting wet presscake containing 40–50% water is used as the charge to the flushing and breaching operations.

EXAMPLE 2

The wet presscake from Example 1 is flushed in a sigma-blade mixer provided with a jacket for heating or cooling and a vacuum for removing water and volatile breaching agent. As flushing vehicle a mixture of oleoresinous materials is used. Resin A is a linseed modified isophthalic glyceryl alkyd resin. Resin B is a butyl phosphate modified maleic resin containing 45.5% solids and 54.5% mineral seal oil. To the flushing vessel is charged 100 parts, dry basis, of the pigment presscake and 22 parts of tetrachloroethylene breaching agent. After mixing for 2-5 minutes, 50 parts of Resin A are charged and mixed until free water breaks out of the flushed mass. To this mixture is added 2 parts turkey red oil, which is mixed for one minute and 1 part of aluminum sulfate salt is added along with 2 parts of aminated resin surfactant. Upon clarification of the aqueous phase, mixing is stopped and the water is decanted. The mixer is then charged three-fourths full with fresh water and mixed for 1 hour with cooling to maintain the temperature at about 30°–40° C. The water is decanted and 25 parts of Resin B is added incrementally with 0.6 parts of phenyl-naphthalamine anti-skinning agent. The pigment, breaching agent and vehicle are then worked under vacuum at about 29 inches of mercury, while permitting the temperature to rise to about 70°–80° C without heating or cooling the flushed mass. This reduces the water content to 1% maximum and completely removes the tetrachloroethylene breaching agent. The formulation is then modified with 25 parts of Resin A and 47 parts of Resin B added slowly to the pigmented vehicle with mixing to give a final product having 40% pigment content.

The positive control was a fully milled pigment ground for 32 hours under substantially the same conditions as the partially milled pigment, except that 9 parts of salt per part pigment were required to obtain full pigmentary strength. This fully milled pigment was acid extracted in the same manner as the partially milled pigment and flushed into the same vehicle using the same procedures, but without the addition of breaching agent. The comparison of tinctorial strength and color properties made by a standard method in which 1 part of the pigmented vehicle sample is mixed with 100 parts of a paste containing white zinc oxide in a litho varnish vehicle and a film is drawn. The tinctorial strength is measured by increasing or decreasing the amount of zinc oxide paste to obtain the same strength for the positive control as for the breached partially milled sample. The breached flushed pigment was equal in tinctorial strength and a trifle red and dull as compared to the fully milled positive control sample. As negative control, the partially milled pigment was flushed as above, except that the tetrachloroethylene breaching agent was omitted. The negative control was 10% weak in strength and moderately red and dull as compared to the positive control.

EXAMPLE 3

The procedure of Example 2 is followed except that 8.7 parts of tetrachloroethylene is used with the same results, except that the shade was slightly red and dull. This difference is overcome by working the flushed mass for 2 hours.

EXAMPLE 4

The procedure of Example 2 is followed except that 65 parts of tetrachloroethylene is used and the first addition of Resin A is decreased to an amount less than that necessary to cause a phase break and this mixture is worked for 1 hour before adding sufficient resin to effect the break. No working of the mixture after the phase separation takes place in this example. The results are the same as for Example 2.

EXAMPLE 5

The procedure of Example 2 is followed except that only 1 part of tetrachloroethylene is used and the flushed mass is not worked beyond that amount to give adequate mixing. The tinctorial strength is 5% weak as compared to the positive control and slightly red and dull.

EXAMPLE 6

The procedure of Example 4 is followed except that the breaching agent consists of 70 parts chloroform. The breached sample was the same as the positive control in tinctorial strength and a trifle red and dull.

EXAMPLE 7

The procedure of Example 2 is followed except that the breaching agent is 5.8 parts of toluene and the flushed mass is worked for 2 hours after the phase separation. The results are the same as in Example 2.

EXAMPLE 8

The procedure of Example 4 is followed except that the breaching agent is 34.7 parts of toluene. This sample is the same as the positive control in tinctorial strength and a trifle red and dull.

EXAMPLE 9

The procedure of Example 2 is followed except that the breaching agent is 5.8 parts xylene and the flushed mass is worked for 2 hours after the phase separation. The tinctorial strength is 3% weak and the shade is slightly red and dull.

EXAMPLES 10–14

The procedures of Examples 1 and 2 are repeated except that the milling time is varied from 0 to 32 hours. The 32 hour milled pigment was not breached with tetrachloroethylene and was used as the positive control and the other samples are compared to this standard. The results are tabulated below:

Table 1

| Example | Milling time (hours) | Tinctorial Strength | Shade Differences |
|---------|---------------------|--------------------|--------------------|
| 10      | 0                   | −200%              | very red and dirty |
| 11      | 4                   | −15%               | considerably red and dirty |
| 12      | 8                   | equal              | trifle green and slightly dirty |
| 13      | 12                  | +2%                | trifle green       |
| 14      | 16                  | +5%                | trifle green and trifle cleaner |
| control | 32                  | —                  | —                  |

EXAMPLE 15

The presscake of Example 1 is flushed into a bodied linseed oil vehicle in the presence of a breaching agent using standard flushing methods with substantially the same results as in Example 2.

EXAMPLE 16

Example 2 is repeated except that the pigment is partially milled quinacridone ground for about one-half the normal time required to develop full pigmentary properties. The flushed pigment with the breaching treatment had essentially the same properties as unbreached fully milled pigment.

EXAMPLE 17

The milling procedure of Example 1 is repeated using as the starting material a partially chlorinated and sulfonated crude copper phthalocyanine blue containing 3% Cl and 0.25% S. The crude was half-milled as in Example 1 except that the milling was carried out for 15 hours at a temperature of 135° C. The product is a red shade non-crystallizing and non-flocculating form of phthalocyanine pigment.

EXAMPLE 18

The wet presscake from Example 17 is flushed using a procedure similar to Example 2. To the flushing vessel is charged 100 parts of red shade phthalocyanine presscake and 22 parts of tetrachloroethylene breaching agent, which are premixed before adding 133 parts of a soya long oil modified pentaerythritol phthalate alkyd resin (Resin C) containing about 7% solids. After the phase separation, 4 parts turkey red oil, 1 part aluminum sulfate and 6 parts aminated rosin surfactant are added. The clarified water is decanted and fresh water is added and these materials are mixed for 1 hour with cooling. After decanting the water, 4 parts of malic acid is added and the flushed mass is vacuum processed to remove the breaching agent and water (0.5% maximum). To the cooled mass is added 29 parts soya lecithin, 64 parts of Resin C, 32 parts odorless mineral spirits and 12 parts methyl ethyl ketoxime antiskinning agent. These components are mixed and the flushed mass is further cut with 118 parts of Resin C and 118 parts of odorless mineral spirits and passes over a 3-roll mill. The final pigment content is 17%. The strength and shade are equal to a positive control batch made from fully milled pigment presscake without the breaching treatment.

EXAMPLE 19

The flushing process of Example 18 is followed using the wet pigment presscake of Example 1 and wherein the breaching agent and solvent are replaced with xylene. The half-milled sample flushed in the presence of xylene gave a product 3% weak in tinctorial strength compared to the fully milled positive control.

EXAMPLE 20

The procedure of Example 18 is followed except that the flushing vehicle is a medium length soya oil modified alkyd resin, and the final pigment content is 13.7%. The half-milled sample flushed in the presence of tetrachlorethylene breaching agent gave a product of equal strength and shade to the positive control.

EXAMPLE 21

In this example the liquid breaching agent is a paraffinic hydrocarbon which is a solvent for the organic vehicle and remains in the flushed mass as an integral part of the pigmented vehicle product. The procedure of Example 2 is repeated except that no tetrachloroethylene is used. The breaching agent is a high-boiling mineral seal oil added as solvent with Resin A in an amount equal to 39.4 parts paraffin hydrocarbon per 100 parts pigment. This breaching agent is slower than the usual organic liquids employed. The flushed mass is worked for 2 hours after separation. This sample is 3% weak in strength and slightly dull and red as compared to the positive control.

In addition to the air-drying oleoresinous vehicles set forth in the above examples, successful flushings in the presence of a breaching agent were obtained in thermally curable vehicles such as hard fossil resin softened by solvent and in a quick setting linseed-maleic rosin type vehicle.

While the invention has been described by reference to specific examples, there is no intent to limit the inventive concept except as set forth in the following claims.

We claim:
1. A process for manufacturing pigmented oleoresinous coating vehicles comprising the steps of;
   partially conditioning a crude organic pigment by dry milling to an extent substantially less than the amount of milling required to develop full pigmentary strength;
   providing an aqueous slurry of the partially conditioned pigment;
   flushing the pigment from an aqueous slurry into a soft oleoresinous vehicle by mixing the aqueous pigment slurry with the vehicle and a volatile organic liquid breaching agent which is essentially immiscible with water under the flushing conditions and which is active to develop pigmentary qualities by contacting the pigment during flushing, said breaching agent being present in an amount at least about 1 part by weight per 100 parts of dry pigment;
   separating water from the flushed mass mixture of pigment, vehicle and breaching agent;
   separating the volatile organic breaching agent from the flushed mass by evaporation,
   thereby producing a pigmented oleoresinous vehicle having pigmentary qualities substantially equal to that produced by incorporating a fully conditioned pigment into the vehicle.

2. The process of claim 1 wherein the breaching agent is selected from the class consisting of paraffinic and cycloaliphatic hydrocarbons having at least 5 carbon atoms, aromatic hydrocarbons having 6 to 10 carbon atoms, halogenated hydrocarbons having 1 to 10 carbon atoms, alkyl ethers having 4 to 14 carbon atoms, alkyl esters of alkanoic acids having a total of 4 to 12 carbon atoms, and liquid mixtures of these organic breaching agents with one another.

3. The process of claim 2 wherein the pigment consists essentially of copper phthalocyanine.

4. The process of claim 1 wherein the breaching agent is added in an amount about equal to 10 to 300 parts per 100 parts by weight of dry pigment.

5. The process of claim 1 wherein the breaching agent is added to the aqueous slurry and oleoresinous vehicle at the beginning of the flushing step.

6. The process of claim 1 wherein the breaching agent is added to the aqueous slurry and oleoresinous vehicle after flushing of the pigment into the vehicle has broken the flushing mixture into aqueous and orgnaic phases.

7. The process of claim 1 wherein the organic pigment is selected from phthalocyanines, quinacridones, dioxazines, perylenes, indathrones and vat pigments and mixtures of these pigments.

8. In the process wherein an organic crystalline crude pigment is conditioned to essentially full pigmentary strength by partial conditioning of the crude pigment in an attrition mill and treatment of the partially milled pigment with a breaching agent to promote further conditioning; the improvement which comprises:
   a. treating the partially milled pigment with a dilute aqueous mineral acid solution;
   b. flushing and further conditioning the wet acid-treated pigment by transferring the pigment into an organic vehicle in which the pigment is dispersible; and contacting the pigment during the flushing step with a conditioning amount of at least 1 part by weight breaching agent per 100 parts dry pigment; said breaching agent consisting essentially of one or more volatile organic breaching liquids selected from aromatic hydrocarbons having 6 to 10 carbon atoms, aliphatic and cyclo-aliphatic hydrocarbons having at least 5 carbon atoms, halogenated hydrocarbons having 1 to 10 carbon atoms, alkyl ethers having 4 to 12 carbon atoms, alkyl esters of alkanoic acids having a total of 4 to 12 carbon atoms, and liquid mixtures of these organic breaching agents with one another; said breaching (agents) liquid boiling below about 200°C and having a maximum solubility in water of about 5% by weight at room temperature; and
   c. separating the pigmented organic vehicle from the agueous phase formed during flushing, said pigmented organic vehicle having a tint strength substantially equal to or greater than that obtained by milling the crude pigment to substantially full pigmentary strength and flushing the fully milled pigment into the organic vehicle without addition of the breaching agent.

9. A process for manufacturing pigmented organic vehicles comprising the steps of:
   milling a crude phthalocyanine pigment to an extent substantially less than that amount of milling required to develop full pigmentary properties:
   slurrying the partially conditioned pigment with a dilute aqueous mineral acid to extract impurities;
   flushing and further conditioning the pigment during the flushing step by mixing the aqueous pigment with a hydrophobic organic vehicle and at least 1 part (sufficient) organic liquid breaching agent per 100 parts by weight of dry pigment in sufficient amount to complete conditioning of the pigment, said breaching agent being essentially immiscible with water under the flushing conditions and being active to develop pigmentary qualities by contacting the pigment during flushing; and
   separating water from the flushed mass mixture of pigment, vechicle and breaching agent,
   thereby producing a pigmented vehicle having pigmentary strength substantially equal to that produced by incorporating a fully conditioned pigment into the vehicle.

10. The process of claim 9 wherein the breaching agent is selected from liquid aliphatic, cycloaliphatic and aromatic hydrocarbons, halogenated aliphatic hydrocarbons, alkyl esters of alkanoic acids, and alkyl ethers having a boiling point not greater than 200° C, viscosity of about 0.2 to 3 centipoises, and a solubility in water at room temperature not greater than 5% by weight.

11. The process of claim 10 wherein the pigment consists essentially of phthalocyanine pigments containing statistically less than one substituent ring group per molecule.

12. The process of claim 9 wherein the breaching agent is added in an amount about equal to at least 10 parts per 100 parts by weight of dry pigment.

13. The process of claim 9 wherein the breaching agent is added to the aqueous slurry and vehicle at the beginning of the flushing step.

14. The process of claim 9 wherein the breaching agent is added to the aqueous slurry and vehicle after flushing of the pigment into the vehicle has broken the flushing mixture into aqueous and organic phases.

15. The process of claim 9 wherein the liquid breaching agent is a solvent for the organic vehicle and remains in the flushed mass as an integral part of the pigmented vehicle product.

16. The process of claim 9 wherein the milling step is carried out in a ball mill with grinding elements having an average size of about 0.25 to 2 cm in the presence of inorganic salt grinding aid, said grinding aid being used in an amount from 1.5 to 4.0 parts salt per part pigment.

17. The process of claim 16 wherein the milling time is less than one half of the time required to develop fully conditioned pigment by milling.

* * * * *

UNITED STATES PATENT OFFICE
CERTIFICATE OF CORRECTION

Patent No. 3,980,488             Dated September 14, 1976

Inventor(s) David W. Barrington, Irwin B. Bernstein, Thomas C. Rees and Anthony P. Wagener, Jr.

It is certified that error appears in the above-identified patent and that said Letters Patent are hereby corrected as shown below:

In the specification.

Col. 2, line 8, "power" should read powder.
Col. 4, line 24, "simple" should read single.
Col. 6, line 17, "colvalent" should read covalent.
Col. 6, line 36, "lowr" should read lower.
Col. 6, line 41, "with" second occurrence should read which
Col. 9, line 51, "7%" should read 70%.

In the claims.

Claim 7, line 26, "indathrone" should read indanthrone;

Signed and Sealed this

Twenty-eighth Day of December 1976

[SEAL]

Attest:

RUTH C. MASON
Attesting Officer

C. MARSHALL DANN
Commissioner of Patents and Trademarks